(12) United States Patent
Mipo et al.

(10) Patent No.: US 7,528,516 B2
(45) Date of Patent: May 5, 2009

(54) ROTARY ELECTRICAL MACHINE HAVING LOSS REDUCTION MEANS

(75) Inventors: Jean-Claude Mipo, Creteil (FR); Lilya Bouarroudj, Paris (FR); Albert Foggia, Grenoble (FR)

(73) Assignee: Valeo Equipments Electriques Moteur, Creteil Cedex (FR)

( * ) Notice: Subject to any disclaimer, the term of this patent is extended or adjusted under 35 U.S.C. 154(b) by 82 days.

(21) Appl. No.: 11/441,350

(22) Filed: May 26, 2006

(65) Prior Publication Data
US 2006/0290225 A1   Dec. 28, 2006

(30) Foreign Application Priority Data
Jun. 28, 2005   (FR) .................................. 05 06575

(51) Int. Cl.
   *H02K 1/18* (2006.01)
(52) U.S. Cl. .................. 310/187; 310/172; 310/216
(58) Field of Classification Search ................ 310/187, 310/172
   See application file for complete search history.

(56) References Cited

U.S. PATENT DOCUMENTS

| | | | | |
|---|---|---|---|---|
| 2,698,910 A | * | 1/1955 | Blyth | 310/51 |
| 2,745,031 A | * | 5/1956 | Rimkus | 310/218 |
| 3,154,708 A | * | 10/1964 | Shaffer | 310/187 |
| 4,112,319 A | * | 9/1978 | Field | 310/49 R |
| 4,217,511 A | | 8/1980 | King, Jr. et al. | |
| 4,672,253 A | * | 6/1987 | Tajima et al. | 310/269 |
| 4,782,272 A | * | 11/1988 | Buckley et al. | 318/400.01 |
| 4,874,975 A | * | 10/1989 | Hertrich | 310/186 |
| 4,933,584 A | * | 6/1990 | Harms et al. | 310/162 |
| 4,947,066 A | * | 8/1990 | Ghibu et al. | 310/49 R |
| 5,086,245 A | * | 2/1992 | Sieja et al. | 310/216 |
| 5,173,651 A | * | 12/1992 | Buckley et al. | 318/701 |
| 5,250,867 A | * | 10/1993 | Gizaw | 310/179 |
| 5,773,908 A | * | 6/1998 | Stephens et al. | 310/254 |
| 5,801,478 A | * | 9/1998 | Nashiki | 310/261 |
| 5,818,187 A | * | 10/1998 | Savage et al. | 318/443 |
| RE37,576 E | * | 3/2002 | Stephens et al. | 310/254 |
| 6,597,080 B2 | * | 7/2003 | Soderberg | 310/224 |
| 6,864,612 B1 | * | 3/2005 | Gotoh | 310/172 |
| 7,098,567 B2 | * | 8/2006 | Ionel et al. | 310/216 |
| 7,143,503 B2 | * | 12/2006 | Ionel et al. | 29/596 |

FOREIGN PATENT DOCUMENTS

| | | |
|---|---|---|
| DE | 102 29 333 A1 | 1/2004 |
| JP | 51125804 | 11/1976 |
| JP | 60-87639 | 5/1985 |
| JP | 2003-264943 | 9/2003 |
| JP | 2003-319575 | 11/2003 |
| JP | 2003319575 A | * 11/2003 |

* cited by examiner

*Primary Examiner*—Quyen P Leung
*Assistant Examiner*—Naishadh N Desai
(74) *Attorney, Agent, or Firm*—Berenato, White & Stavish, LLC

(57) ABSTRACT

In a rotary electrical machine, the stator is subject to eddy currents, causing losses. These losses are reduced by extending the path of the eddy currents whilst avoiding causing saturation. The invention therefore proposes to form recessed zones or slots (2) in the teeth (1) of the stator whose depth does not exceed one-half of the height of the tooth (1).

23 Claims, 3 Drawing Sheets

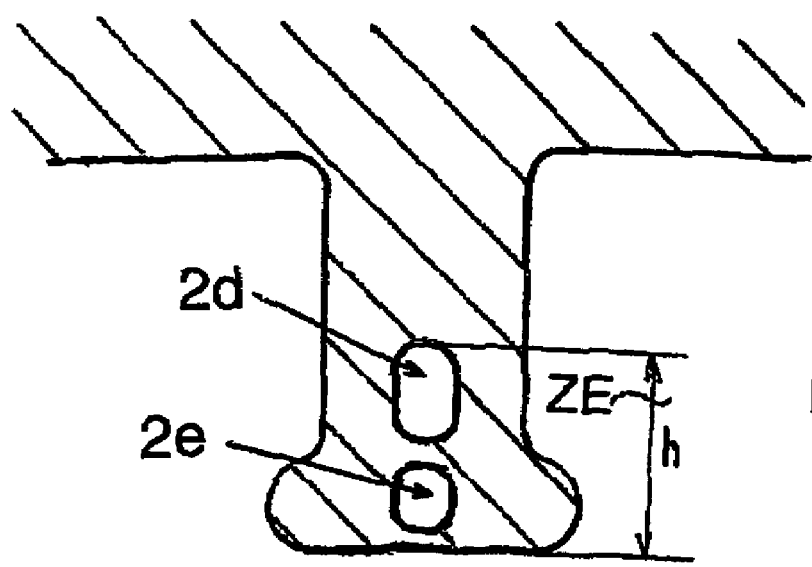

ROTARY ELECTRICAL MACHINE HAVING LOSS REDUCTION MEANS

FIELD OF THE INVENTION

The present invention relates to rotary electrical machines, in particular to alternators for motor vehicles, having loss reduction means.

BACKGROUND OF THE INVENTION

More particularly, the invention concerns a rotary electrical machine, and in particular a motor vehicle alternator, having a rotor and a stator, the stator having a casing and a plurality of notches for field winding and armature winding turns, and teeth separating the adjacent notches, the said teeth each comprising a base by means of which the tooth is connected to the casing of the stator, and an end face turned towards the rotor, the end face of at least one tooth comprising at least one slot in an intermediate angular position or positions between the edges of the teeth that delimit the said notches.

The slot means here a recess whose depth in a radial direction perpendicular to the axis of the machine is greater than the width of the slot in a circumferential direction perpendicular to the axis of the machine and to the said radial direction.

French patent application FR-A-2 784 518 describes a rotary electrical machine of the aforementioned type. In the machine, the stator comprises split teeth in order to reduce the magnetic noise. In this application, the depth of a slot in a tooth of the stator in question in the radial direction is substantially equal to the maximum value corresponding to the distance between the end face and the base of the tooth, referred to as the height of the tooth.

SUMMARY OF THE INVENTION

In such a machine, a magnetic flux is generated by the stator for driving the rotor, or by the rotation of the rotor. This flux can give rise to eddy current phenomena in the stator teeth, in the form of current loops. The intensity of these currents, giving rise to resistive losses (referred to as "iron losses") and heating of the magnetic material of the stator, is inversely proportional to the resistance of the path travelled by the current in the material. Thus, by forming a slot in the material, the current is forced to pass around this slot, which extends the path of the current loop, thus increasing the resistance of this current path. Losses by eddy currents can therefore be reduced by means of slots.

However, the current supplied by the alternator is lower because of a reduction in the cross section of the tooth because of the slot. This is because the surface for generating the magnetic flux is smaller, which gives rise to a reduction in the magnetic flux and therefore in the current generated.

The aim of the present invention is in particular to mitigate this drawback.

The rotary electrical machine according to the invention, in particular a motor vehicle alternator, has a rotor and a stator, the stator comprising a casing and a plurality of notches for receiving armature winding turns, and teeth separating the adjacent notches, the teeth each comprising a base by means of which the tooth is connected to the stator casing, and an end face turned towards the rotor, the end face of at least one tooth comprising at least one recess zone in an intermediate angular position or positions between the edges of the teeth that delimit the notches, the recess zone having the function of reducing the eddy current losses by an increase in the path of said current. More precisely, the recess zone comprises at least one recess and extends in the radial direction over a depth that is less than a maximum value corresponding to one half of the distance between the end face and the base of the tooth, referred to as the height of the tooth.

By virtue of these provisions, the eddy current path is such that the eddy current losses are reduced compared with a machine whose teeth are not split.

Moreover, by virtue of these provisions, the cross section of the tooth is not excessively reduced so that the flow rate of the current is not excessively reduced compared with a machine with split teeth according to the prior art illustrated by the document FR-A-2 784 518.

In various non-limiting embodiments of the method according to the invention, it is possible to have recourse also to one or other or all of the following provisions:

- the maximum value of the depth of the recess zone is between 25% and 35% of the height of the tooth;
- the maximum value of the depth of the recess zone is substantially equal to one-third of the height of the tooth;
- all the teeth of the stator comprise at least one recess zone;
- the width of the recess zone at the end face of the tooth is between 1% and 50% of the width of the said end face, these widths being defined in a circumferential direction perpendicular to the axis of the machine and to the radial direction;
- the said at least one recess is a slot emerging on the end face of the tooth and, at the bottom of the slot, the cross section of the slot along a plane essentially perpendicular to the axis of the machine is rounded in shape;
- the slot has a substantially trapezoidal shape that extends broadening out from the base of the tooth towards the end face, and the said cross section of the slot along a plane essentially perpendicular to the axis of the machine and rounded in shape forms an arc of at least 180°;
- at least one tooth comprises a plurality of slots on its end face, at least one first slot amongst the said plurality of slots having a depth less than the maximum value of the depth;
- at least one second slot in the tooth has a depth different from the depth of the first slot in the said tooth;
- the depth of the second slot is greater than the maximum value;
- at least one tooth has a central slot with a given depth, and two lateral slots, respectively on each side of the said central slot in a circumferential direction perpendicular to the axis of the machine and to the radial direction of the said central slot, and with respective depths less than the depth of the said central tooth.

Other characteristics and advantages of the invention will emerge from a reading of the following description of various embodiments, given by way of non-limiting examples, with regard to the accompanying drawings.

BRIEF DESCRIPTION OF THE DRAWINGS

FIG. 6 is a view in section of a tooth of a stator according to a fifth embodiment of the present invention.

DESCRIPTION OF THE PREFERRED EMBODIMENTS

In the various figures, the same reference designates identical or similar elements.

Figure 1:
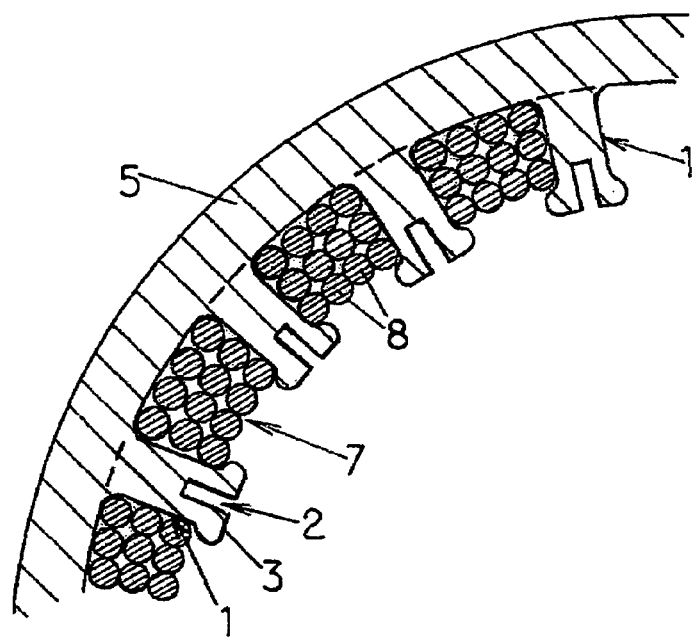
FIG. 1 is a view in partial transverse section of a stator of a rotary machine according to the invention.

FIG. 1 shows a partial section of a stator of a rotary electrical machine such as an alternator comprising a plurality of teeth each having a slot 2, and a casing 5. The space between each pair of adjacent teeth forms a notch 7 inside which armature winding turns 8, for example made from copper, are housed. The winding 8 can alternatively be a field winding, according to the type of machine.

Figure 2:
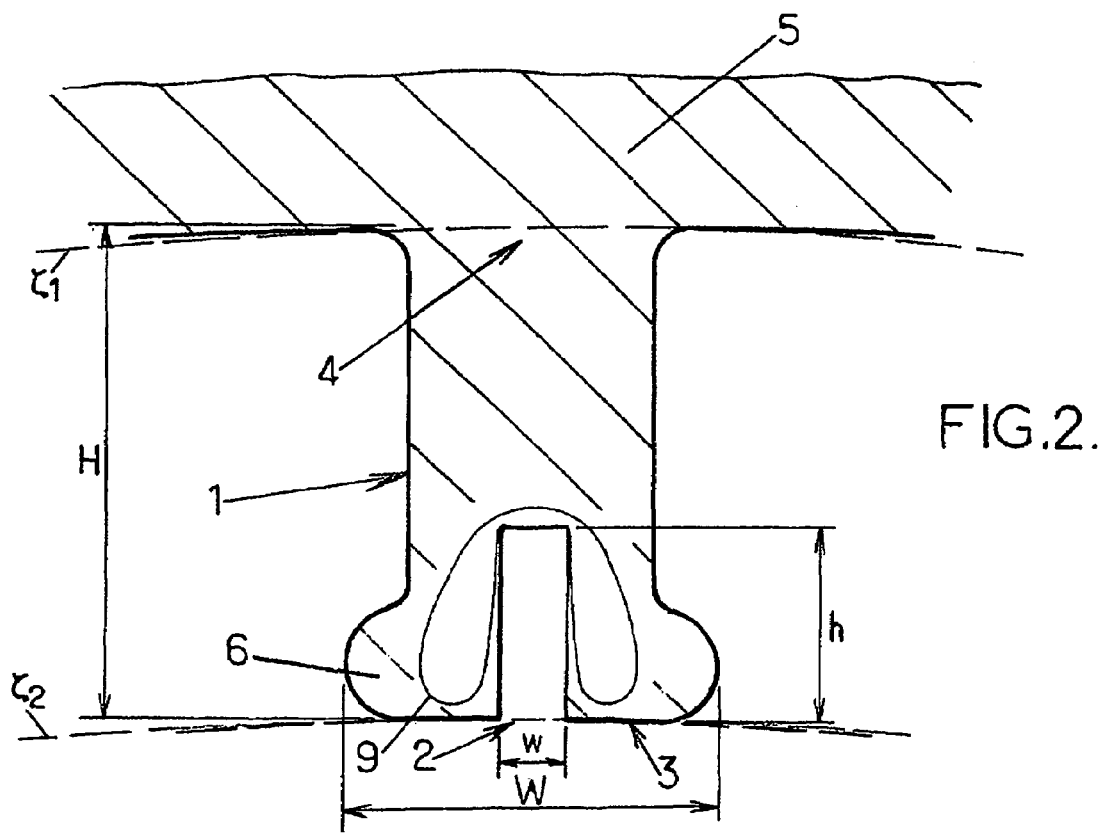
FIG. 2 is a view in section of a tooth of the stator in FIG. 1 according to a first embodiment of the present invention.

As depicted in FIG. 2, the tooth 1 comprises an end face 3, which can be a portion of a cylinder of revolution with its axis merged with the axis of revolution of the rotary machine. A tooth base 4 connects the tooth 1 to the casing 5 of the stator. The height H of the tooth 1 of the stator can be defined by the distance separating the end face 3 of the tooth of the stator 1 and the base 4 of the tooth in a radial direction. Equally, it can be defined by the distance separating on the one hand an external cylinder C1 passing through all the bases of the teeth of the stator 1 and having as its axis the rotation axis of the machine and on the other hand an internal cylinder C2, coaxial with the external cylinder C1 passing through all the end faces 3 of the teeth 1.

The tooth of the stator 1 has a slot 2 whose depth h, also taken in a radial direction, is less than one-half of the height H of the tooth 1. Preferably the height h is between 25% and 35% of the height H and, even more preferably, the depth h is equal to approximately one-third (33%) of the height H.

The slot 2 is thus not too deep in order not to divert the eddy current loop, depicted schematically by the solid line referenced 9, at the base 4 of the tooth 1. In addition, through various simulations carried out by the applicant, it has been shown that the optimum depth for the reduction of eddy current losses is approximately one-third because the magnetic saturation of the material around the foot of the tooth 6 (with or without protrusions) is greater than in the base of the tooth 4. Consequently the efficacy of the rotary machine is improved and the iron losses reduced.

Moreover, in an embodiment according to FIG. 2, the tooth 1 has a tooth foot 6 substantially broadened compared with the rest of the tooth 1. According to the embodiment thus depicted, the width w of the slot 1 taken in a circumferential direction perpendicular to the axis of the machine is less than one half of the width W of the tooth foot 6, taken in this same direction.

Thus the width of the slot 2 is not too great, so that a magnetic flux, flowing in the tooth in the radial direction, is not disturbed by the presence of the slot 2.

Figure 3:
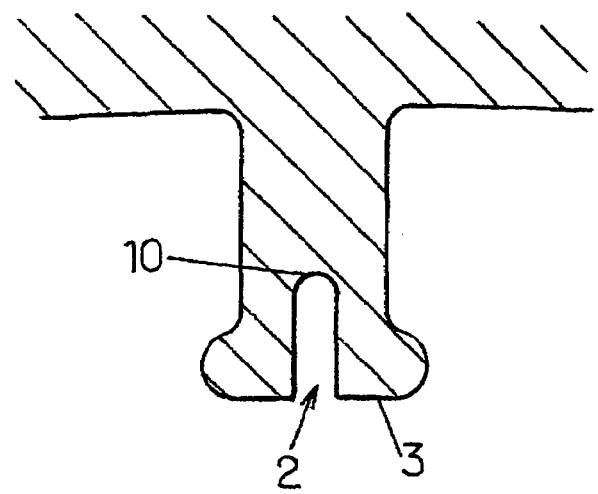
FIG. 3 is a view in section of a tooth of a stator according to a second embodiment of the present invention.

According to a second embodiment depicted in FIG. 3 the slot 2 has a slot bottom 10 whose shape is substantially rounded.

By rounding the bottom of the slot 10, a concentration at one point of the eddy currents is prevented in the vicinity of the bottom of the slot 10. This thus limits the heating due to the passage of a high current at a limited spatial extension point. Thus, by using a rounded shape, it is possible to prevent heating and therefore deterioration to the material making up the stator.

Figure 4:
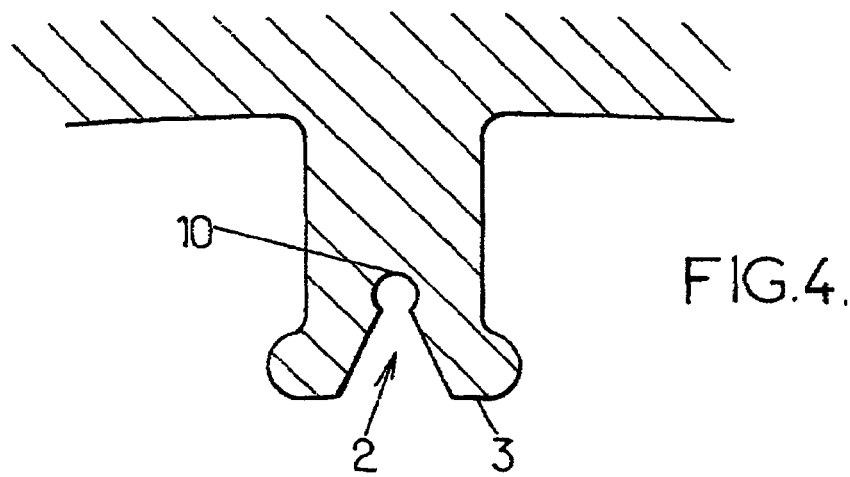
FIG. 4 is a view in section of a tooth of a stator according to a third embodiment of the present invention.

FIG. 4 shows a third embodiment in which the cross section of the slot 2 in a plane perpendicular to the axis of the machine has substantially a trapezoidal shape broadening out as the end face is approached from the base of the tooth. In addition, as in the second embodiment, the bottom of the slot 10 is also rounded in shape. In the case shown, the rounded part of the bottom of the slot 10 can form an arc of a circle with an angle greater than 180°.

Such a slot shape is easy to produce, for example by a punching method or a laser cutting method. Consequently the cost of manufacturing such a stator is reduced.

Figure 5:
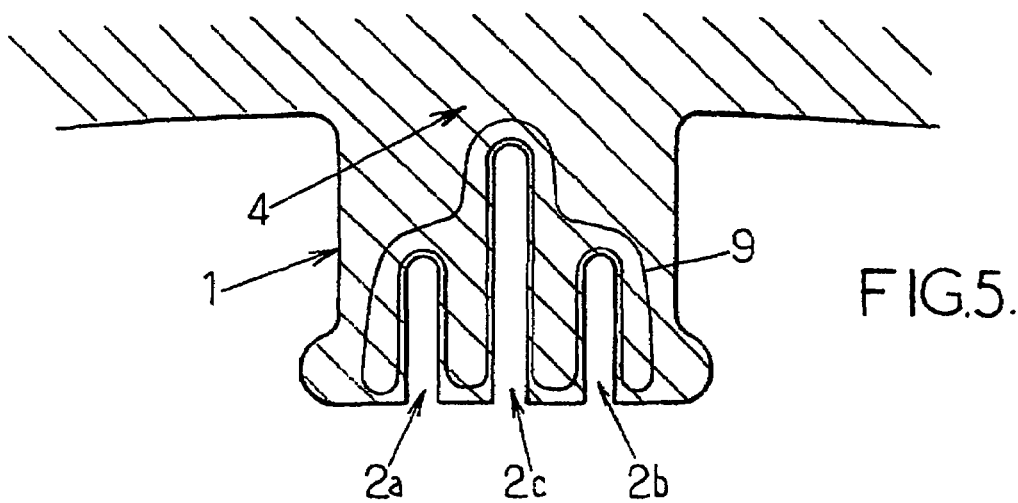
FIG. 5 is a view in section of a tooth of a stator according to a fourth embodiment of the present invention.

According to a fourth embodiment illustrated by FIG. 5, a tooth 1 comprises a plurality of slots 2*a*, 2*b*, 2*c* with different depths. A first lateral slot 2*a* and a second lateral slot 2*b* are disposed on each side of a central slot 2*c*. The central slot 2*c* can be deeper than the other slots 2*a* and 2*b* and even deeper than half of the height H of the tooth.

Using a plurality of slots, the eddy current loops are so elongated that the intensity of the current is very greatly reduced. Moreover, this has advantages with regard to magnetic noise. This is because, in a rotary electrical machine, the variations in magnetic induction generate a magnetic noise in the magnetic material, in particular in the stator. Thus, by producing slots in the teeth of the stator, the frequency harmonics of the magnetic noise are pushed towards higher frequencies, possibly beyond the auditory sensitivity of humans. In addition, the magnetic noise is reduced.

The adjacent slots 2*a* and 2*b* have depths substantially less than one-half of the height of the tooth but may be different. In the case shown, the lateral slots 2*a* and 2*b* are symmetrical with each other with respect to the central slot 2*c*, the latter being disposed substantially at the middle of the end face 3 of the tooth, in the circumferential direction. Other spatial distributions of the plurality of slots can be adapted on the end face 3.

By placing the slot so as to be the deepest or central posterior, it is avoided interfering with the magnetic flux passing through the base of the tooth. The fact that the depth and position of the slots are random better distributes the harmonics of the magnetic noise, and also the intensity of the magnetic noise.

According to a fifth embodiment illustrated by FIG. 6, a tooth 1 comprises a recess zone ZE whose depth h, taken in a radial direction, is less than one-half of the height H of the tooth.

In general terms, in accordance with the invention, this recess zone ZE can comprise one or more recesses having substantially the same function as the slots described in the first to fourth embodiments. As shown in FIG. 6, the recess zone comprises here two recesses 2*d* and 2*e*.

This fifth embodiment is more recommended for an application of the invention in polyphase machines of the concentrated winding type. This is because, in this type of machine, a recess zone produced in the form of one or more slots opening out at the end face of the tooth could result in a certain crushing of the tooth, for example during the operation of winding the wire around it, because of a flexing due to a reduction in the mechanical strength of the tooth.

In this fifth embodiment, the recesses 2*d* and 2*e* are separated by a portion forming a rib of the carcass of the tooth. In addition, the recess 2*e* does not open out on the end face of the tooth, which also participates in the mechanical strength thereof. Naturally, in other embodiments, the recess 2*e* can take the form of a slot opening out on the end face of the tooth.

According to other embodiments, all the teeth comprise at least one recess zone or a slot, for improving the effect of reduction in eddy current losses and reduction in the magnetic noise, extending it to all the machine.

According to one embodiment, these slots or recess zones are produced by punching or laser cutting.

What is claimed is:

1. A rotary electrical machine comprising:
a rotor and a stator,
the stator comprising a casing, a plurality of notches for receiving armature winding turns, and teeth separating the adjacent notches,
each of the teeth comprising a base connecting the tooth to the casing of the stator and an end face facing the rotor, the distance between the end face and the base of each of the teeth defines a height of the tooth,
the end face of at least one tooth comprising at least one recess zone in an intermediate angular position or positions between edges of the at least one tooth that delimit the notches,
the at least one recess zone provided for reducing the eddy current losses by increasing the path of the current,
wherein the at least one recess zone comprising at least one recess being void of any armature windings and extending in the radial direction over a depth that is less than one half of the height of the tooth,
wherein the depth being substantially equal to one-third of the height of the tooth, and
wherein the at least one tooth including the at least one recess zone is symmetrical relative to a radial line extending through a middle of the end face of the at least one tooth in the circumferential direction.

2. The machine according to claim 1, wherein all the teeth of the stator comprise at least one recess zone.

3. The machine according to claim 1, wherein the width of the at least one recess zone at the end face is between 1% and 50% of the width of the said end face, the width is defined in a circumferential direction perpendicular to an axis of the machine and to the radial direction.

4. Machine according to claim 1, in which the said recess is a slot emerging on the end face of the tooth and, at the bottom of the slot the cross section of the slot along a plane essentially perpendicular to the axis of the machine is rounded in shape.

5. Machine according to claim 4, in which the slot has a substantially trapezoidal shape that extends broadening out from the base of the tooth towards the end face, and the said cross section of the slot along a plane essentially perpendicular to the axis of the machine and rounded in shape, forms an arc of at least 180°.

6. Machine according to claim 4, in which at least one tooth comprises a plurality of slots on its end face, at least one first slot amongst the said plurality of slots having a depth less than the maximum value.

7. Machine according to claim 6, in which at least one second slot in the tooth has a depth different from the depth of the first slot in the said tooth.

8. Machine according to claim 7, in which the depth of the second slot is greater than the maximum value.

9. Machine according to claim 7, in which at least one tooth has a central slot with a given depth, and two lateral slots, respectively on each side of the said central slot in a circumferential direction perpendicular to the axis of the machine and to the radial direction of the said central slot, and with respective depths less than the depth of the said central tooth.

10. A rotary electrical machine, in particular a motor vehicle alternator, comprising:
a rotor and a stator,
the stator comprising a casing and a plurality of notches for receiving armature winding turns, and
teeth separating adjacent notches,
said teeth each comprising a base connecting the tooth to casing of the stator and an end face facing the rotor, the distance between the end face and the base of each of the teeth defines a height of the tooth,
the end face of at least one tooth comprising a single recess zone in an intermediate substantially central angular position between the edges of the at least one tooth that delimit the notches,
the single recess zone being void of any armature windings and having the function of reducing eddy current losses by an increase in the path of said current,
wherein the single recess zone comprising at least one recess and extending in the radial direction over a depth that is less than one half of the height of the tooth, and wherein the depth being substantially equal to one-third of the height of the tooth.

11. The machine according to claim 10, wherein all the teeth of the stator comprise at least one recess zone.

12. The machine according to claim 10, wherein the width of the at least one recess zone at the end face is between 1% and 50% of the width of said end face, the width is defined in a circumferential direction perpendicular to an axis of the machine and to the radial direction.

13. Machine according to claim 10, in which said recess is a slot emerging on the end face of the tooth and, at the bottom of the slot, the cross section of the slot along a plane essentially perpendicular to the axis of the machine is rounded in shape.

14. Machine according to claim 10, in which the slot has a substantially trapezoidal shape that extends broadening out from the base of the tooth towards the end face, and said cross section of the slot along a plane essentially perpendicular to the axis of the machine and rounded in shape, forms an arc of at least 180°.

15. The machine according to claim 1, wherein the at least one recess is not open at the end face of the at least one tooth.

16. The machine according to claim 1, wherein the at least one recess zone comprises at least two recesses extending radially inline and radially spaced from each other.

17. The machine according to claim 16, wherein at least one of the at least two recesses is not open at the end face of the at least one tooth.

18. The machine according to claim 1, wherein the at least one recess zone includes a plurality of recess zones each including at least one recess; and wherein the tooth including the plurality of the recess zones is symmetrical relative to the radial line extending through the middle of the end face of the tooth in the circumferential direction.

19. The machine according to claim 1, wherein the at least one tooth includes a middle recess and two side recesses disposed on circumferentially opposite sides of the middle recess; and wherein a depth of middle recess is bigger than depths of the side recesses.

20. The machine according to claim 19, wherein the side recesses are arranged radially symmetrically with respect to the middle recess.

21. The machine according to claim 10, wherein the single recess zone is symmetrical relative to a radial line extending through a middle of the end face of the tooth in the circumferential direction.

22. The machine according to claim 10, wherein the single recess zone includes at least two recesses extending radially inline and radially spaced from each other.

23. The machine according to claim 22, wherein at least one of the at least two recesses is a radially enclosed recess which is not open at the end face of the at least one tooth.

* * * * *